March 8, 1949.  J. R. KUNZELMAN  2,463,978
WEEDLESS FISH BAIT
Filed April 2, 1945
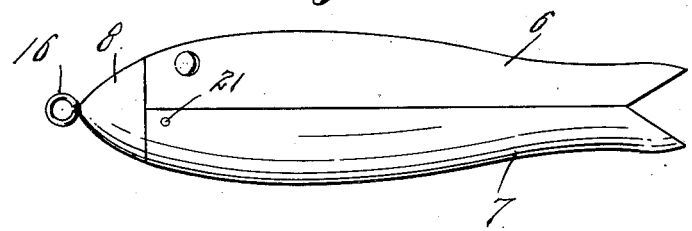
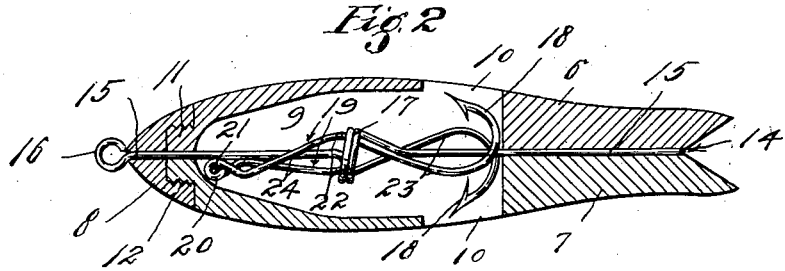
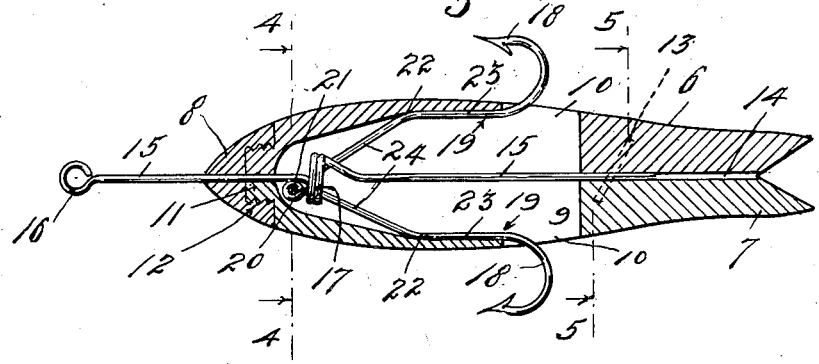
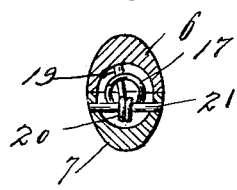
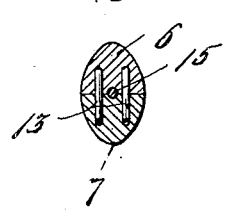
INVENTOR
John R. Kunzelman
By his Attorney
Harry D. Kilgore Patented Mar. 8, 1949

2,463,978

UNITED STATES PATENT OFFICE 2,463,978

WEEDLESS FISH BAIT

John R. Kunzelman, Stillwater, Minn.

Application April 2, 1945, Serial No. 586,161

1 Claim. (Cl. 43—35)

My present invention relates to improvements in artificial fish baits and more particularly to a weedless fish bait that simulates a small fish.

The principal object of this invention is to provide a fish bait having one or more hooks retracted therein and which automatically project outwardly of the bait at the time a fish strikes the bait.

Another object of this invention is to provide a fish bait in which the hook or hooks may be held retracted with a variable sensitivity.

Other objects of the invention will be apparent from the following description and the accompanying drawing.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is a view of the improved bait in side elevation;

Fig. 2 is a view in central longitudinal vertical section;

Fig. 3 is a view corresponding to Fig. 2 with the exception that the hooks are projected;

Fig. 4 is a detail view with some parts sectioned on the line 4—4 of Fig. 3; and Fig. 5 is a detail view principally in section taken on the irregular line 5—5 of Fig. 3.

The fish bait, which, as shown, simulates a small fish, comprises an upper section 6, a lower section 7 and a head section 8. The two sections 6 and 7 are duplicates and have therein a cavity 9. Upper and lower hook passageways 10 in the sections 6 and 7 have communication with the cavity 9 at the rear end portion thereof.

Integral with the sections 6 and 7 at their front ends is a two-part boss 11 that is in axial alignment with the bait. The head section 8 is recessed to receive the boss 11 and has screw-threaded engagement therewith, as indicated at 12. Obviously, the head section 8 by its threaded engagement with the boss 11 holds the sections 6 and 7 in assembled relation. A pair of oblique dowel pins 13, rearwardly of the cavity 9, further assist in holding the sections 6 and 7 in assembled relation. A bore 14 extends axially through the head section 8 and the sections 6 and 7 at their meeting surfaces, see Fig. 5.

A rod 15 is mounted in the bore 14 for endwise sliding movement. Normally, this rod 15 extends the entire length of the bore 14. The outer end portion of the rod 15 is shaped to form an eye 16 to which a fish line, not shown, may be attached. The rod 15, at its intermediate portion, is coiled to form a relatively large eye 17 that extends transversely in the cavity 9. A pair of fish hooks 18 are anchored for movement into and out of the cavity 9 through the passageways 10. The shanks 19 of the hooks 18 extend through the eye 17 and are connected by a coiled spring 20. These shanks 19 are anchored to the section 7 by a pin 21 which extends through the spring 20 and has its end portions secured in the sides of said section close to the front end of the cavity 9. Both hooks 18, their shanks 19 and the spring 20 are all formed from a single piece of spring steel wire. Both shanks 19 are intermediately bent to form in each thereof a hump 22. The spring 20 is under strain to separate the shanks 19 and project the hooks 18 outwardly through the passageways 10. When the hooks 18 are in operative positions, as shown in Fig. 3, the sections 23 of the shanks 19 between the hooks 18 and the humps 22 are substantially parallel and are yieldingly held by the spring 20 against the sections 6 and 7 which act as stops. The sections 24 of the shanks between the spring 20 and the humps 22 are in diverging relation.

Normally, the rod 15 is entirely within the bait and the eye 17 encircles the shank sections 23 and holds the hooks 18 retracted and entirely within the cavity 9, as shown in Fig. 2. An outward pull on the rod 15 relative to the body will cause the eye 17 to ride over the humps 22, downwardly on the shank section 24 and thereby release the shanks 19 and permit the tensioned spring 20 to separate said shanks 19 and project the hooks 18 outwardly through the passageways 10, as shown in Fig. 3.

When the rod 15 is manually pushed inwardly, from its position shown in Fig. 3, the eye 17 will ride over the diverging shank section 24 with a cam action and thereby draw the shanks 19 toward each other and pull the hooks 18 through the passageways 10 and into the cavity 9. The final inward movement of the rod 15 will force the eye 17 over the humps 22 and onto the shank section 23 and thereby hold the hooks retracted, as shown in Fig. 2.

By drawing the eye 17 outwardly on the humps 22, the sensitivity at which the hooks 18 are released may be controlled, at will.

Obviously, the above described weedless fish bait may be cast among weeds and freely pulled therethrough without catching thereon or on any other obstruction. When a fish strikes, the movement of the bait will be arrested and a continued pull by the fisherman on the bait will pull the rod 15 outwardly relative to the bait, and thereby release the hooks 18. The released hooks 18 will be projected through the passageways 19 under the action of the spring 20 and catch the fish. Or in case the fish starts to run with the bait, the same result will take place.

From what has been said, it will be understood that the weedless fish bait described is capable of modification as to details of construction and arrangement within the scope of the invention herein disclosed and claimed.

What I claim is:

In a bait of the class described, a rigid body having a transverse entrance passageway at its intermediate portion, said body having a deep cavity extending forwardly of the entrance passageway, a pair of hooks in the passageway and having spring connected shanks extending into the cavity, said shanks being under strain to project the hooks in opposite directions outwardly through the passageway, the walls of the body in the cavity limiting the separation of the shanks and the projection of the hooks outwardly through the passageway, the shanks of the hooks having outwardly extending humps, and a rod extending longitudinally through the passageway and the cavity and having its end portions mounted in the body for endwise sliding movement, said rod having at its foremost end means for attaching a fish line thereto, said rod having within the cavity a transverse eye through which the shanks of the hooks extend, said eye, when the rod is pushed rearwardly endwise relative to the body, rides on the humps of the shanks and draws said hooks into the passageway, and said eye, when the rod is pulled endwise forwardly relative to the body, rides on the humps of the shanks and releases the hooks for projection outwardly of the cavity by said spring connected shanks.

JOHN R. KUNZELMAN.

REFERENCES CITED

The following references are of record in the file of this patent:

UNITED STATES PATENTS

| Number | Name | Date |
|---|---|---|
| 312,796 | Clark | July 7, 1885 |
| 985,659 | Clayton | Feb. 28, 1911 |
| 1,012,548 | Hill | Dec. 19, 1911 |
| 1,197,820 | Guise | Sept. 12, 1916 |
| 1,217,639 | Berglund | Feb. 27, 1917 |
| 1,459,042 | Wrege | June 19, 1923 |
| 1,726,063 | Glassman | Aug. 27, 1929 |